United States Patent Office 3,217,052
Patented Nov. 9, 1965

3,217,052
SEPARATION OF DIVINYLBENZENE FROM A MIXTURE COMPRISING DIVINYLBENZENE AND ETHYLVINYLBENZENE
Paul D. Meek, Big Spring, Tex., and David Rubinstein, Brookline, Mass., assignors to Cosden Oil & Chemical Company, Big Spring, Tex., a corporation of Texas
No Drawing. Filed Nov. 23, 1962, Ser. No. 239,782
8 Claims. (Cl. 260—669)

This invention relates to the preparation of a purified divinylbenzene, and is more particularly directed to the separation of divinylbenzene from its mixture with ethylvinyl benzene and various impurities.

Divinylbenzene finds utility as a cross-linking agent in the polymerization of styrene and copolymers of styrene. Moreover, it can be copolymerized with various other monomers, such as chlorostyrene, butadiene, isoprene, cyclopentadiene, methyl methacrylate, vinyl acetate and other vinyl derivatives to yeld polymers with properties differing from the homo-polymers of these compounds.

Divinylbenzene is normally produced by the dehydrogenation of a mixture of the isomers of diethylbenzene. The reaction product contains principally a mixture of divinylbenzene, ethylvinylbenzene, unreacted diethylbenzene, a small quantity of naphthalene, and some impurities. Unfortunately, fractionation of this mixture does not function to separate the divinylbenzene from the other components since partial or complete gelling of the mixture occurs during distillation. Hence, the only commercially available divinylbenzene is the impure mixture with ethylvinylbenzene and other components previously described.

Accordingly, it is an object of this invention to provide a means of preparing a substantially purified divinylbenzene, and more specifically, to prepare such a purified divinylbenzene from a mixture in which an appreciable quantity of ethylvinylbenzene is also present.

We have found that the formation of a coordination complex with a monovalent salt of copper or silver can be used for separating divinylbenzene from its mixture with ethylvinylbenzene.

In brief, a liquid mixture of divinylbenzene and ethylvinylbenzene is brought into contact with the solid monovalent salt of copper or silver, for example, cuprous chloride or silver chloride, and allowed to remain for a time. The monovalent salt forms a coordination compound, preferentially with the divinylbenzene. The coordination compound, or adduct, is separated from the liquid phase by simple filtration and is decomposed by heating to about 75° C., or somewhat higher. The solid monovalent salt is removed by filtration and the resulting liquid is found to contain a substantially increased concentration of divinylbenzene.

Preferably, the solid coordination compound which is removed by filtration is placed in a container to which an appreciable quantity of inert liquid has been added. During the decomposition step, which is accomplished by raising the temperature of the solid coordination compound and the inert liquid to about 75° C., or somewhat higher, the presence of this inert liquid assures that an even means of heat transfer is available to cause decomposition of the adduct. After the decomposition step is completed, filtration is utilized to remove the metallic monovalent salt, which may be used again if desired, from the mixture of the inert liquid and the liquid released by decomposition of the adduct. This liquid mixture, plus inert wash liquid which may be used to wash the recovered solid monovalent, salt, if desired, is then heated, preferably under vacuum, to distill off the inert liquid and wash liquid. The resulting liquid residue is found to be a divinylbenzene of relatively high purity, in excess of 90% being typical, when following the process described above.

It is noted that the above separation process can be effectively conducted when diethylbenzene and various other common impurities are present along with the divinylbenzene and ethylvinylbenzene.

In some instances, it is desirable to add a lower primary alcohol to the liquid mixture prior to contacting it with the solid monovalent salt of silver or copper. The alcohol, specifically methyl, ethyl, or propyl alcohol, apparently catalyzes the formation of the adduct. However, as will be seen hereinafter, the process may be run without such alcohol.

At times it is found to be beneficial to add a quantity of inert liquid to the anhydrous cuprous chloride at the time it is contacted with the original divinylbenzene mixture to be purified. This expedient is primarily utilized in those cases where the liquid to solid ratio would otherwise be quite low.

The following examples specifically illustrate the practice of this invention. In each of the examples, the percentages are given on a weight basis.

EXAMPLE 1

To a beaker containing 300 grams of commercial divinylbenzene at 21° C. composed of 2.3 percent diethylbenzene, 41.3 percent ethylvinylbenzene, 54.7 percent divinylbenzene and 1.7 percent of various impurities, was added 150 grams of anhydrous cuprous chloride at 21° C. while constantly stirring. Stirring was continued for a period of thirty minutes. At the end of the first fifteen minutes, the temperature had risen to 38° C. and then it dropped to about 35° C. in the next fifteen minutes.

It was observed that the cuprous chloride formed a solid adduction compound with part of the commercial divinylbenzene. After the lapse of the thirty-minute reaction time, the adduct was separated by filtering the mixture through a Buchner funnel to remove the unreacted hydrocarbon. The adduct so recovered by filtration was washed with toluene to remove impurities. Thereafter, the adduct was heated in a beaker in the presence of 150 milliliters of toluene at 80° C., while agitating the resultant slurry. After the temperature of 80° C. was reached, the slurry was filtered and the recovered solid, which was found to be cuprous chloride, was washed with 50 milliliters of toluene. The filtrate plus the toluene wash were subject to vacuum distillation, at a pressure of about 1 mm. absolute and a temperature of about 50° C. to remove toluene. The resulting liquor was found to contain 94.5 percent divinylbenzene and only 5.5 percent ethylvinylbenzene. It will be appreciated that this process upgraded in initial mixture which contained less than 55 percent divinylbenzene to a 94.5 percent divinylbenzene product. Note that 41.2 percent ethylvinylbenzene in the commercial divinylbenzene charge was cut down to a mere 5.5 percent in the final product; thus the quantity of ethylvinylbenzene in the final product was cut down to less than one-eighth the quantity originally present.

EXAMPLE 2

To a beaker containing 300 grams of commercial divinylbenzene at 21° C., of the same analysis used in Example 1 above, was added 81 grams of anhydrous cuprous chloride at 21° C. while constantly stirring. Stirring was continued for one hour. As in Example 1, the adduct was filtered, washed with toluene, and heated in the presence of toluene to 80° C. while agitating the resultant slurry. The slurry was then filtered and the filtrate collected. The recovered solid was washed with toluene, which wash was combined with the filtrate. After vacuum distilling the toluene from the filtrate-wash combination, the resulting mixture was found to contain 95.5 percent divinylbenzene and only 4.5 percent ethylvinylbenzene.

From the foregoing two examples, it will be noted that there was little difference in the ultimate result although the reaction was allowed to take place for an hour in Example 2, just twice as long as the thirty minutes allowed in Example 1. It would thus appear that time is not critical, at least in the time ranges used in the examples. This was confirmed by observing the temperatures of the reaction when cuprous choride is added to a charge of the commercial divinylbenzene. Temperature was found to rise steadily until it levels out in about fifteen minutes. Thereafter, the temperature begins to drop slowly. By following the same procedure and running analyses on a small quantity of sample withdrawn at various times, it was determined that approximately 92 percent of the reaction had taken place after fifteen minutes, the time in which the system reaches maximum temperature and levels out. It would thus be expected that for reaction times in excess of fifteen minutes, essentially the same results would be obtained. The preceding two examples, and the following examples herein bear this out.

EXAMPLE 3

To a beaker containing a mixture of 300 grams of commercial divinylbenzene, having the same analysis as in Example 1, and 100 milliliters of toluene as an inert diluent, at 7° C., were added 150 grams of cuprous chloride at 7° C. Stirring was maintained during the reaction time of one hour, and the temperature of the reactants was controlled to maintain the system at 7° C. The adduct was collected by filtration and processed as in Example 1. Upon distilling off of the toluene from the filtrate and wash combination, the resulting residue was found to contain 89 percent divinylbenzene and 11 percent ethylvinylbenzene.

EXAMPLE 4

To a beaker containing 150 grams of commercial divinylbenzene, having the same analysis as in Example 1, at 0° C., were added 150 grams of anhydrous cuprous chloride at 0° C. while constantly stirring. One hour's reaction time was allowed, during which period the system was substantially at 0° C. The adduct was collected and processed as in the prior examples, and the resulting product contained 90.1 percent divinylbenzene and 9.9 percent ethylvinylbenzene.

EXAMPLE 5

A series of experiments were conducted in the manner of Example 1, using commercial divinylbenzene having the same analysis as in Example 1, as a starting material; however, the relative quantities and conditions were as follows:

The initial temperature of the commercial divinylbenzene and cuprous chloride is shown in Column 1, Table 1, below; the ratio of anhydrous cuprous chloride to commercial divinylbenzene of the analysis of Example 1 was in accordance with the value indicated in Column 2, Table 1; the reaction time was as in Column 3, Table 1; and methyl alcohol was added in quantity shown in Column 4, Table 1 to the commercial divinylbenzene prior to its contact with the cuprous chloride. Column 5, Table 1, gives the weight percent of divinylbenzene in the processed product recovered from the adduct; and Column 6, Table 1, shows the percent recovery from the adduct of total divinylbenzene available in the commercial divinylbenzene.

*Table 1*

| Run No. | Col. 1 Temp. (° C.) | Col. 2 Ratio, CuCl/DVB | Col. 3 Reaction time (hours) | Col. 4 Methyl alcohol (percent by wt.) | Col. 5 Wt. percent divinyl-benzene in product | Col. 6 Percent DVB recovered |
|---|---|---|---|---|---|---|
| 1 | 25 | 2:1 | 1 | 0 | 95.2 | 28.7 |
| 2 | 25 | 1:1 | 1 | 0 | 94.7 | 30.5 |
| 3 | 25 | .5:1 | 1 | 0 | 93.3 | 34.4 |
| 4 | 25 | .5:1 | 1 | 2 | 95.1 | 35.6 |
| 5 | 25 | 2:1 | 1 | 2 | 96.7 | 30.9 |
| 6 | 25 | .5:1 | 2 | 2 | 95.1 | 34.9 |
| 7 | 25 | .5:1 | 2 | 2 | 95.3 | 34.2 |
| 8 | 25 | 1:1 | 2 | 2 | 95.6 | 33.6 |
| 9 | 25 | 1:1 | 1 | 2 | 91.9 | 34.4 |
| 10 | 25 | 1:1 | 1 | 2 | 94.4 | 33.8 |
| 11 | 25 | .5:1 | 1 | 2 | 96.1 | 32.5 |
| 12 | 25 | .5:1 | 1 | 2 | 94.2 | 35.3 |
| 13 | 10 | .5:1 | 1 | 2 | 91.3 | 35.5 |
| 14 | 4 | 4:1 | 2 | 2 | 88.6 | 60.7 |
| 15 | 0 | 1:1 | 2 | 2 | 93.1 | 71.7 |
| 16 | 0 | 2:1 | 2 | 2 | 94.1 | 78.4 |
| 17 | 0 | 2:1 | 2 | 2 | 93.4 | 70.0 |
| 18 | −50 | 1:1 | 1 | 2 | 75.9 | 71.7 |

Bearing the first four examples in mind, it will be observed from Table 1 that temperature appears to be the most important variable. While percentage divinylbenzene of the final adduct decomposition product varies little with temperature, it is noted that percent divinylbenzene recovered, i.e., quantity of divinylbenzene in the product divided by quantity of divinylbenzene in the charge times 100, increases substantially with decrease in temperature. The runs conducted at 25° C. initial temperature gave around 34 percent recovery, while runs conducted at 0° C. gave in excess of 70 percent recovery. At between 0° C. and 10° C. it is seen that the recovery percentage changes quite rapidly. Thus at 10° C., recovery was only 35.5%, while at 4° C., recovery was up to 60.7%. It would therefore appear that a maximum temperature of about 4° C. (plus or minus a few degrees) is critical for good recovery. For this reason, a temperature below 10° C., and preferably below about 4° C. is preferred.

The methyl alcohol appeared to have some catalytic action, increasing the rate of reaction somewhat, but its use is shown to be optional for the various reaction times and conditions of the runs of Table 1.

EXAMPLE 6

By mixing commercial divinylbenzene, having the analysis of Example 1, and substantially pure diethylbenzene a mixture was prepared having the following analysis: 71.3 percent diethylbenzene, 10.8 percent ethylvinylbenzene, 15.5 percent divinylbenzene, and 2.4 percent impurities.

Forty grams of the above mixture, at 25° C., were added to 20 grams of cuprous chloride in a beaker at 25° C., and the resulting mixture in the beaker was agitated for thirty minutes. As confirmed both by analysis and temperature observation, reaction took place so slowly as to be impractical for most commercial operations.

EXAMPLE 7

Forty grams of a mixture of commercial divinylbenzene and ethylbenzene, having the analysis of Example 6 above, were added to 20 grams of cuprous chloride in a beaker, the initial temperature of the system being 23° C., and in addition, 0.8 gram of methyl alcohol were introduced into the beaker. As in Example 6, the contents of the beaker were agitated for thirty minutes. At the end of thirty minutes the temperature was observed to have risen to 31° C., and on separating the solid phase, decomposing it, and recovering the liquid released thereby, by the methods of Example 1, a product was obtained having 96.4 percent divinylbenzene and only 3.6 percent ethylvinylbenzene. Comparing this example with Example 6, it is seen that methyl alcohol served to catalyze the reaction. Ethyl alcohol or propyl alcohol may effectively be used in place of methyl alcohol, if desired.

From the preceding, it will be appreciated that a process has been devised for separating divinylbenzene from its mixture with ethylvinylbenzene, as well as with common impurities found in commercial divinylbenzene. It is seen that a product having a purity in excess of 90 percent by weight divinylbenzene may be prepared by the adduction process of the instant invention. It will be apparent that by running a successive adduction process, the purity of divinylbenzene product may be further increased.

The copper salt used in the adduction process employed in this invention may be any solid monovalent copper salt, for example, in addition to cuprous chloride, cuprous nitrate, cuprous sulfate, cuprous phosphate, cuprous formate, etc. The corresponding silver salt may also be used.

It has been seen that if it is desired (as in those cases where the raw material is weak in divinylbenzene) to use a catalyst, methyl alcohol may be used, or instead, ethyl, or propyl alcohol may be substituted therefor.

Various modifications will occur to those skilled in the art and accordingly, it is intended that the description herein given be regarded as illustrative and not limiting except as defined in the claims appending hereto.

We claim:
1. A method of separating divinylbenzene from a mixture comprising divinylbenzene and ethylvinylbenzene comprising the steps of:
   (A) contacting the mixture at a temperature below about 25° C., in liquid state, with a solid salt selected from the group consisting of monovalent copper and silver salts to form a coordination compound;
   (B) separating said coordination compound so obtained from the liquid phase;
   (C) heating said coordination compound to recover a liquid having a substantially higher divinylbenzene content and having a substantially lower ethylvinylbenzene content than said original mixture.

2. The method of claim 1 in which said solid monovalent salt is a salt of copper.

3. The method of claim 1 in which said solid monovalent salt is cuprous chloride.

4. A method of separating divinylbenzene from a mixture comprising dinvinylbenzene and ethylvinylbenzene comprising the steps of
   (A) contacting the mixture, at a temperature below 10° C., in liquid state, with cuprous chloride to form a solid coordination compound,
   (B) separating said coordination compound so obtained from the mother liquor;
   (C) heating said coordination compound to a temperature above about 75° C. to decompose said coordination compound to recover therefrom a liquid having a substantially higher divinylbenzene content and a substantially lower ethylvinylbenzene content than said original mixture.

5. The method of claim 4 in which a compound selected from the group consisting of methyl alcohol, ethyl alcohol and propyl alcohol is added to the mixture as a catalyst during step (A).

6. The method of claim 4 in which the heating of said coordination compound of step (C) is carried out in the presence of an inert liquid and in which said liquid recovered from the coordination compound is separated from said inert liquid.

7. The method of claim 5, wherein the separation of said liquid and said inert liquid is accomplished by distillation.

8. A method of separating divinylbenzene from a mixture comprising dinvinylbenzene and ethylvinylbenzene comprising the steps of
   (A) contacting the mixture, at a temperature below 10° C., in liquid state, with cuprous chloride to form a solid coordination compound,
   (B) separating said coordination compound so obtained from the mother liquor;
   (C) heating said coordination compound in an inert liquid boiling below the divinylbenzene to a temperature above about 75° C. to decompose said coordination compound to recover therefrom a liquid having a substantially higher divinylbenzene content and a substantially lower ethylvinylbenzene content than said original mixture and separating the inert liquid by distilling the mixture at a low temperature at which the liquid divinylbenzene is stable.

References Cited by the Examiner

UNITED STATES PATENTS 2,973,394   2/61   Atkinson et al. _____ 260—669

DELBERT E. GANTZ, *Primary Examiner.*
ALPHONSO D. SULLIVAN, *Examiner.*